United States Patent
Cohan et al.

(10) Patent No.: US 11,673,448 B2
(45) Date of Patent: Jun. 13, 2023

(54) HEAT PUMP SYSTEM FOR ELECTRIC VEHICLE

(71) Applicant: Nikola Corporation, Phoenix, AZ (US)

(72) Inventors: Aiden Cohan, Phoenix, AZ (US);
Akshit Markan, Phoenix, AZ (US);
Derek McVay, Phoenix, AZ (US)

(73) Assignee: Nikola Corporation, Phoenix, AZ (US)

( * ) Notice: Subject to any disclaimer, the term of this patent is extended or adjusted under 35 U.S.C. 154(b) by 28 days.

(21) Appl. No.: 17/380,268

(22) Filed: Jul. 20, 2021

(65) Prior Publication Data
US 2022/0324288 A1 Oct. 13, 2022

Related U.S. Application Data

(60) Provisional application No. 63/174,380, filed on Apr. 13, 2021.

(51) Int. Cl.
*F25B 7/00* (2006.01)
*B60H 1/00* (2006.01)
(Continued)

(52) U.S. Cl.
CPC ..... *B60H 1/00385* (2013.01); *B60H 1/00278* (2013.01); *B60H 1/00485* (2013.01); *B60H 1/00885* (2013.01); *B60L 58/26* (2019.02); *B60L 58/27* (2019.02); *H01M 10/613* (2015.04); *H01M 10/625* (2015.04); *H01M 10/6569* (2015.04); *H01M 10/663* (2015.04); *B60H 2001/00307* (2013.01); *B60H 2001/00942* (2013.01); *B60H 2001/00957* (2013.01); *B60K 1/04* (2013.01); *B60K 6/28* (2013.01);
(Continued)

(58) Field of Classification Search
CPC ............ B60H 1/00385; B60H 1/00278; B60H 1/00485; B60H 1/00885; B60H 2001/00307; H01M 10/613; H01M 10/625; H01M 10/6569; H01M 10/663; B60L 58/27; B60L 58/26
USPC .......................................................... 62/79
See application file for complete search history.

(56) References Cited

U.S. PATENT DOCUMENTS

| 7,975,757 B2 | 7/2011 | Nemesh et al. |
| 8,448,696 B2 | 5/2013 | Johnson et al. |
| 2016/0107503 A1 | 4/2016 | Johnston |

FOREIGN PATENT DOCUMENTS

| DE | 112019006706 | * 10/2021 |
| KR | 20180051419 | 5/2018 |

OTHER PUBLICATIONS

International Search Report and Written Opinion for PCT/US2021/042373, dated Oct. 21, 2021.
(Continued)

*Primary Examiner* — Davis D Hwu
(74) *Attorney, Agent, or Firm* — Snell & Wilmer L.L.P.

(57) ABSTRACT

The present disclosure provides a thermal management system for an electric vehicle. The electric vehicle may include a cabin, a battery system, a battery coolant loop including a battery coolant line thermally coupled to the battery system, a heat pump loop including a heat pump line thermally coupled to an internal heat exchanger, and a refrigerant-coolant heat exchanger thermally coupled to the battery coolant loop and the heat pump loop. The thermal management system may be configured to provide heating or cooling to the cabin or battery system depending on an operating mode.

15 Claims, 8 Drawing Sheets

(51) Int. Cl.
*B60L 58/26* (2019.01)
*B60L 58/27* (2019.01)
*H01M 10/613* (2014.01)
*H01M 10/625* (2014.01)
*H01M 10/663* (2014.01)
*H01M 10/6569* (2014.01)
*B60K 1/04* (2019.01)
*B60K 1/00* (2006.01)
*B60K 6/28* (2007.10)

(52) U.S. Cl.
CPC ..... *B60K 2001/005* (2013.01); *B60L 2200/36* (2013.01); *B60Y 2200/14* (2013.01); *B60Y 2200/91* (2013.01); *B60Y 2200/92* (2013.01); *B60Y 2306/05* (2013.01); *B60Y 2306/07* (2013.01); *H01M 2220/20* (2013.01)

(56) References Cited

OTHER PUBLICATIONS

"Heat Exchangers" (Brogan), Feb. 13, 2011, retrieved from https://www.thermopedia.com/content/832/.

* cited by examiner

HEAT PUMP SYSTEM FOR ELECTRIC VEHICLE

CROSS-REFERENCE TO RELATED APPLICATION

This application claims priority to and the benefit of U.S. Provisional Application No. 63/174,380 filed Apr. 13, 2021 entitled "HEAT PUMP SYSTEM FOR ELECTRIC VEHICLE," the entirety of which is herein incorporated by reference, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to heat pump systems, and more particularly, to heat pump systems for electric vehicles.

BACKGROUND

Modern electric vehicles typically include a battery system capable of storing energy to be used to power the electric vehicle. For example, electrical energy provided by the battery system may be used to power one or more electric motors to drive the vehicle's wheels as well as power multiple other electrically-operated systems of the vehicle. In order to maximize battery lifespan and performance, the battery system may be thermally regulated using an onboard thermal management system. Traditional thermal management systems may include one or more electric heaters intended to precondition (or preheat) the battery system to a desired temperature range in cold ambient conditions. However, these electric heaters are commonly powered by the same battery systems they are intended to thermally regulate and, as a result, can adversely impact battery life and range of the associated vehicle. Accordingly, thermal management systems capable of thermally regulating the battery system while minimizing the impact on battery life and vehicle range are desirable.

SUMMARY

In various embodiments, an electric vehicle comprises a cabin, a battery system, and a heat pump thermal management system. The thermal management system comprises a battery coolant loop comprising a battery coolant line thermally coupled to the battery system, a heat pump loop comprising a heat pump line thermally coupled to an internal heat exchanger, and a refrigerant-coolant heat exchanger thermally coupled to the battery coolant loop and the heat pump loop. In a first operating mode of the heat pump thermal management system, thermal energy is transferred from the battery system to the heat pump loop via the refrigerant-coolant heat exchanger. In a second operating mode of the heat pump thermal management system, thermal energy is transferred from the cabin to the heat pump loop via the internal heat exchanger. In a third operating mode of the heat pump thermal management system, thermal energy is transferred from the battery system to the heat pump loop via the refrigerant-coolant heat exchanger and thermal energy is transferred from the cabin to the heat pump loop via the internal heat exchanger.

In various embodiments, the battery coolant loop may further comprise a radiator, an expansion tank, a pump, and a first control valve. The heat pump loop may further comprise an external heat exchanger, a compressor, an expansion valve, a second control valve, a third control valve, and a fourth control valve. In the first operating mode, thermal energy may be transferred from the battery system to a coolant in the battery coolant line and thermal energy may be transferred from the coolant to a refrigerant of the heat pump loop in the refrigerant-coolant heat exchanger. In the first operating mode, thermal energy may be transferred from the refrigerant to an ambient environment via an external heat exchanger and the refrigerant may be directed to the refrigerant-coolant heat exchanger to absorb thermal energy from the coolant. In the second operating mode, the first control valve may bypass the refrigerant-coolant heat exchanger and a coolant in the battery coolant line may directed to the radiator to transfer thermal energy to an ambient environment. In the second operating mode, the fourth control valve may bypass the refrigerant-coolant heat exchanger and a refrigerant in the heat pump line may be directed to the internal heat exchanger to allow thermal energy to be transferred from the cabin to the internal heat exchanger. In the third operating mode, the second control valve may direct a refrigerant from the refrigerant-coolant heat exchanger to the internal heat exchanger and thermal energy may be transferred from the cabin to the refrigerant in the internal heat exchanger. The refrigerant-coolant heat exchanger may function as a countercurrent heat exchanger and facilitate thermal energy transfer between the heat pump loop and the battery coolant loop in the first operating mode and the third operating mode.

In various embodiments, an electric vehicle comprises a cabin, a battery system, and a heat pump thermal management system. The thermal management system comprises a battery coolant loop comprising a battery coolant line thermally coupled to the battery system, a heat pump loop comprising a heat pump line thermally coupled to an internal heat exchanger, and a refrigerant-coolant heat exchanger thermally coupled to the battery coolant loop and the heat pump loop. In a first operating mode of the heat pump thermal management system, thermal energy is transferred from the heat pump loop to the battery system via the refrigerant-coolant heat exchanger. In a second operating mode of the heat pump thermal management system, thermal energy is transferred from the heat pump loop to the cabin via the internal heat exchanger. In a third operating mode of the heat pump thermal management system, thermal energy is transferred from the heat pump loop to the battery system via the refrigerant-coolant heat exchanger and thermal energy is transferred from the heat pump loop to the cabin via the internal heat exchanger.

In various embodiments, the battery coolant loop may further comprise a radiator, an expansion tank, a pump, and a first control valve. The heat pump loop may further comprise an external heat exchanger, a compressor, an expansion valve, a second control valve, a third control valve, and a fourth control valve. In the first operating mode, thermal energy may be transferred from a refrigerant of the heat pump loop to a coolant of the battery coolant loop in the refrigerant-coolant heat exchanger. The first control valve may bypass the radiator in the first operating mode, bypasses the refrigerant-coolant heat exchanger in the second operating mode, or bypasses the radiator in the third operating mode. The refrigerant-coolant heat exchanger may function as a cocurrent heat exchanger and facilitate thermal energy transfer between the heat pump loop and the battery coolant loop in the first operating mode and the third operating mode. An external heat exchanger may facilitate thermal energy transfer from an ambient environment to the heat pump loop in the first operating mode, the second operating mode, or the third operating mode. The second control valve may bypass the internal heat exchanger in the second operating mode. The refrigerant-coolant heat exchanger may be inactive in the second operating mode.

In various embodiments, a method of thermally regulating a battery system and cabin of an electric vehicle by using a heat pump thermal management system comprises cooling, in a first operating mode of the heat pump thermal management system, the battery system by transferring thermal energy from the battery system to a heat pump loop via a refrigerant-coolant heat exchanger. The method further comprises cooling, in a second operating mode of the heat pump thermal management system, the cabin by transferring thermal energy from the cabin to the heat pump loop via an internal heat exchanger; cooling, in a third operating mode of the heat pump thermal management system, the battery system and the cabin by transferring thermal energy from the battery system to the heat pump loop via the refrigerant-coolant heat exchanger and transferring thermal energy from the cabin to the heat pump loop via the internal heat exchanger; heating, in a fourth operating mode of the heat pump thermal management system, the battery system by transferring thermal energy from the heat pump loop to the battery system via the refrigerant-coolant heat exchanger; heating, in a fifth operating mode of the heat pump thermal management system, the cabin by transferring thermal energy from the heat pump loop to the cabin via the internal heat exchanger; and heating, in a sixth operating mode of the heat pump thermal management system, the battery system and the cabin by transferring thermal energy from the heat pump loop to the battery system via the refrigerant-coolant heat exchanger and transferring thermal energy from the heat pump loop to the cabin via the internal heat exchanger. In the first operating mode, the second operating mode, and the third operating mode, a refrigerant of the heat pump thermal management system may be circulated in a first direction, and in the fourth operating mode, the fifth operating mode, and the sixth operating mode, the refrigerant may be circulated in a second direction.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1:
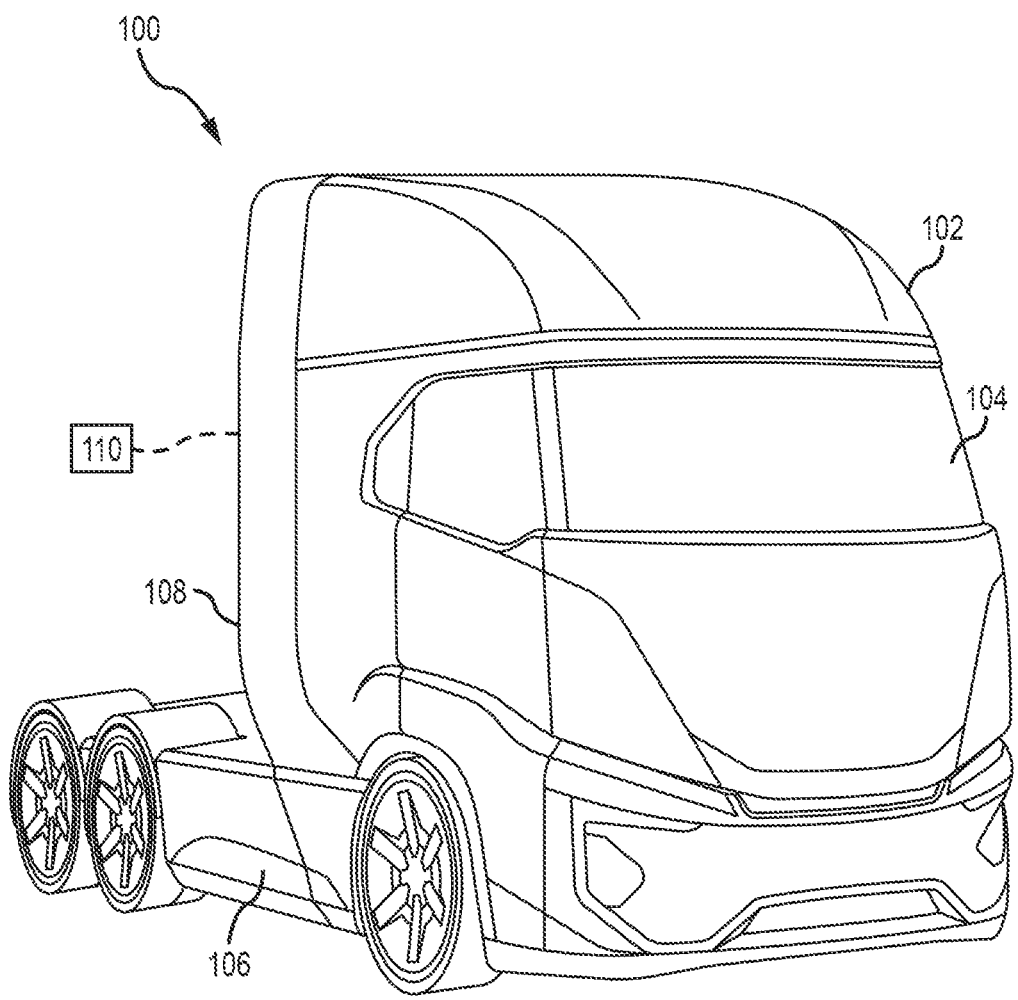
FIG. 1 illustrates a perspective view of an electric vehicle comprising a heat pump thermal management system, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with battery electric vehicles (including hybrid battery electric vehicles), fuel cell electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of a battery and thermal management system of the same. As such, numerous applications of the present disclosure may be realized.

Modern electric vehicles may utilize various power sources to provide electrical energy to one or more electric motors designed to drive the vehicle's wheels. Among the types of electric vehicles currently being researched and developed at a wide scale are battery electric vehicles and fuel cell electric vehicles. Both battery electric vehicles and fuel cell electric vehicles comprise onboard battery systems used to power the electric drivetrain of the vehicle as well as other electrically powered systems. In the case of battery electric vehicles, the battery systems are charged via an external power source (for example, the grid or renewable energy sources) and discharged during vehicle operation to power the vehicle's drivetrain and electronics. In contrast, fuel cell electric vehicles facilitate an electrochemical reaction via one or more fuel cell stacks that generate an electric current used to power the electric vehicle drivetrain and electronics and charge the battery system, which may, under certain operating conditions, supplement or replace power output from the fuel cell stacks.

One drawback associated with contemporary electric vehicles is the need to thermally regulate battery systems in order to maximize battery lifespan and performance. For example, modern electric vehicle battery systems ideally operate in a range of about 25° C. — 30° C. in order to achieve maximum battery lifespan and performance. Generally, battery systems operating below these temperatures experience reduced performance due to increased internal resistance and lower capacity, while battery systems operating above these temperatures experience reduced lifespan and increased risk of thermal runaway.

In order to ensure proper thermal regulation of the onboard battery systems, electric vehicles may be equipped with thermal management systems capable of heating the battery systems during relatively cold ambient conditions and cooling the battery systems during relatively hot ambient conditions. Typically, these thermal management systems include one or more in-line electric heaters that draw electrical energy from the onboard battery system and convert electrical energy to thermal energy by passing it through a resistor. In turn, the thermal energy can be used to heat or preheat the battery systems as well as heat a cabin interior of the vehicle.

The efficiency of heating and cooling systems can be described by the system's coefficient of performance (or COP). The COP of heating and cooling systems is defined as the heating or cooling output of the system divided by the power input into the heating or cooling system. Electric heaters, such as those utilized in conventional thermal management systems of electric vehicles, have a maximum practical COP of one. In contrast, heat pump systems have maximum practical COPs of three to four depending on heating and cooling requirements and equipment involved. As such, thermal management systems for electric vehicles that avoid the use of in-line electric heaters, and instead utilize a heat pump system, may experience as much as a three to four-fold increase in overall thermal efficiency. As a result, heat pump systems require less energy from the onboard battery systems leading to greater operating range for the vehicle.

Accordingly, with reference to FIG. 1, a perspective view of a vehicle 100 incorporating a heat pump thermal management system is illustrated, in accordance with various embodiments. Vehicle 100 is an electric vehicle incorporating an electric powertrain. More specifically, vehicle 100 may be an electric commercial vehicle, such as, for example, a class 8 heavy duty commercial vehicle. Vehicle 100 may be a battery electric vehicle, fuel cell electric vehicle, or any other vehicle comprising an onboard battery system where thermal regulation is desirable. Moreover, vehicle 100 may comprise a commercial vehicle of a different weight class or a passenger vehicle in various embodiments. It should be appreciated that vehicle 100 may comprise any vehicle type utilizing a thermal management system wherein heat may be transferred to or from the ambient environment and manipulated within a vapor compression refrigeration cycle to heat and/or cool various components of the vehicle.

With continued reference to FIG. 1, vehicle 100 comprises a body 102 which defines a cabin 104 configured to contain at least one passenger. For example, cabin 104 may comprise one or more seats, sleepers, or other features configured to provide comfort to an operator or other passenger. Vehicle 100 comprises a heating, ventilation, and air conditioning (HVAC) system which may provide clean air, heat, and cooling to cabin 104, depending on operator preference, the ambient temperature around vehicle 100, and/or the like. While illustrated herein as comprising a cabover style body, body 102 is not limited in this regard and may comprise an American style or other style of body.

Vehicle 100 further comprises a battery system 106. Battery system 106 may be a rechargeable, or secondary, battery configured to store electrical energy from an external power source (for example, a charging station), from a fuel cell stack, from a solar panel disposed on vehicle 100, and/or from regenerative braking or other applications. Battery system 106 may release this stored electrical energy to power one or more electric motors and/or to supply power to other vehicle components that utilize electricity to operate. In various embodiments, battery system 106 may comprise lithium-ion battery cells; however, battery system 106 is not limited in this regard and may comprise other rechargeable battery types such as a lead-acid battery, nickel-cadmium battery, nickel-metal hydride battery, lithium iron sulfate battery, lithium iron phosphate battery, lithium sulfur battery, solid state battery, flow battery, or any other type of suitable battery. Battery system 106 may further comprise multiple battery cells coupled in series and/or parallel to increase voltage and/or current. The cells of battery system 106 may comprise any suitable structure including cylindrical cells, prismatic cells, or pouch cells. Moreover, battery system 106 may at least partially comprise other energy storage technologies such as an ultracapacitor.

In various embodiments, in addition to battery system 106, vehicle 100 may optionally comprise a fuel cell stack 108. Fuel cell stack 108 may comprise one or more fuel cells capable of facilitating an electrochemical reaction to produce an electric current. For example, the one or more fuel cells may be proton-exchange membrane (PEM) fuel cells which may receive a fuel source (such as diatomic hydrogen gas) which may react with an oxidizing agent (such as oxygen) to generate electricity with heat and water as byproducts. The fuel cells may be electrically coupled in series and/or parallel to increase voltage and/or current and form fuel cell stack 108. In various embodiments, fuel cell stack 108 may comprise fuel cells other than PEM fuel cells, for example, alkaline fuel cells, phosphoric acid fuel cells, molten carbonate fuel cells, solid oxide fuel cells, or any other suitable fuel cell type.

As will be discussed in greater detail below, vehicle 100 further comprises a heat pump thermal management system 110. Heat pump thermal management system 110 may be configured to provide heating and cooling to various system components, for example, one or more of battery system 106, fuel cell stack 108, or cabin 104. Heat pump thermal management system 110 may utilize one or more coolant loops, one or more refrigeration loops, and one or more heat exchangers, for example, configured to heat, cool, or otherwise thermally regulate these features depending on operating conditions of vehicle 100. For example, heat pump thermal management system 110 may be configured to operate in at least the following operating modes:

| Ambient Temperature Range | Heat Pump Operating Mode |
|---|---|
| 30° C.-50° C. | Battery Cooling |
| 20° C.-50° C. | Cabin Air Conditioning |
| 30° C.-50° C. | Battery Cooling + Cabin Air Conditioning |
| −30° C.-0° C. | Battery Preheating |
| −30° C.-20° C. | Cabin Heating |
| −30° C.-0° C. | Battery Preheating + Cabin Heating |

Figure 2A:
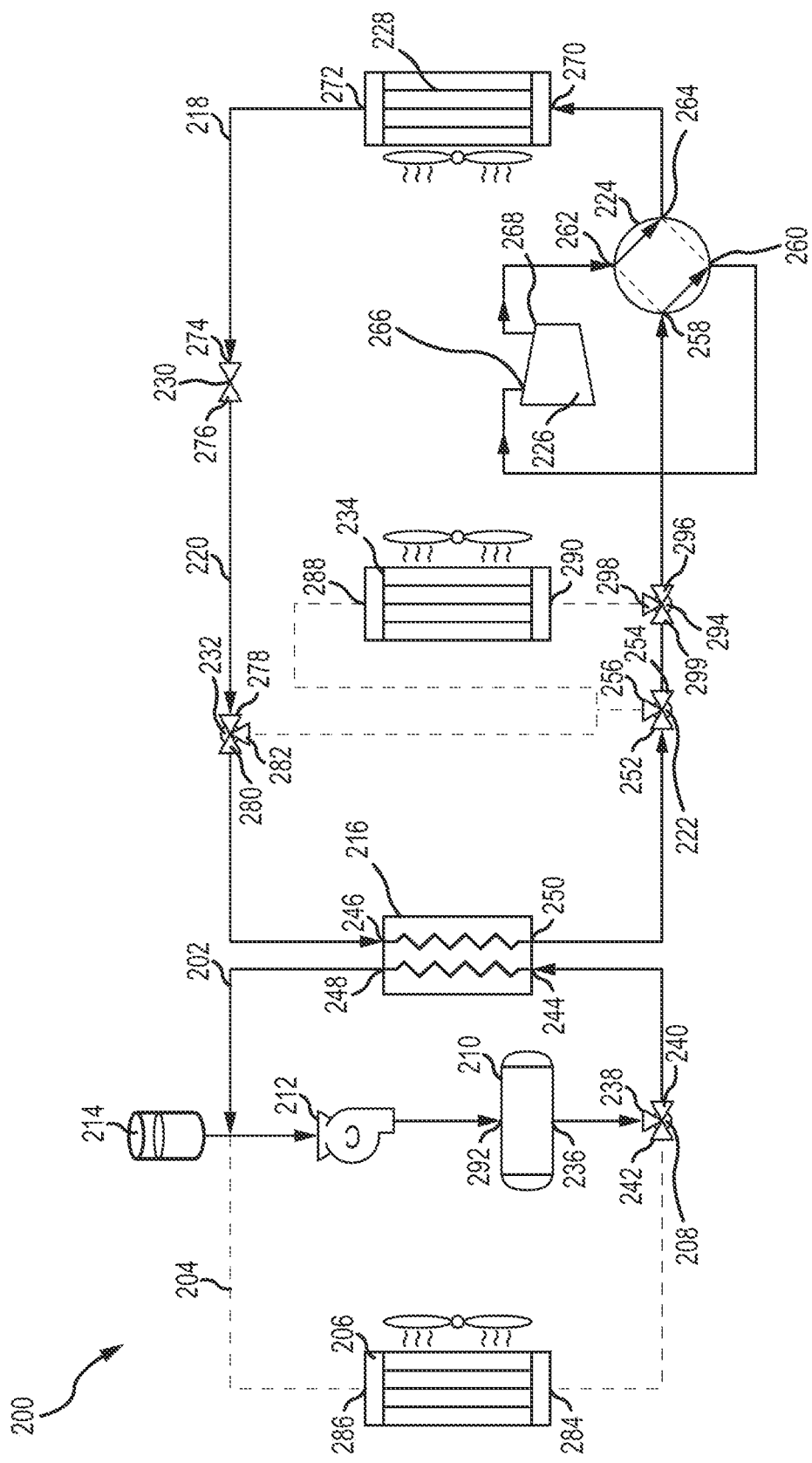
FIG. 2A illustrates a heat pump thermal management system in a first operating mode, in accordance with various embodiments.

With reference now to FIG. 2A, a heat pump thermal management system 200, which may be similar to heat pump thermal management system 110 of FIG. 1, is illustrated in accordance with various embodiments. Heat pump thermal management system 200 comprises a battery coolant loop 202. Battery coolant loop 202 is configured to heat or cool a battery system associated with an electric vehicle (such as electric vehicle 100 of FIG. 1) by exchanging heat with the battery system as will be discussed in further detail below. In various embodiments, battery coolant loop 202 comprises a battery coolant line 204 which fluidly and thermally couples together a radiator 206, a first control valve 208, a battery system 210, a pump 212, an expansion tank 214, and a refrigerant-coolant heat exchanger 216.

Depending on operating conditions and whether battery system 210 is desired to be heated or cooled, battery coolant loop 202 is configured to route a battery coolant in either direction. For example, as illustrated in FIG. 2A, battery coolant loop 202 is configured to route battery coolant in a first direction (counterclockwise as illustrated) while bypassing radiator 206. However, in various embodiments, battery coolant loop 202 is configured to route coolant in the first direction while passing coolant through radiator 206 or route coolant in a second direction (clockwise as illustrated). In the second direction, radiator 206 may be bypassed or active as part of battery coolant loop 202. As such, battery coolant loop 202 is configured to operate in numerous manners in order to thermally regulate battery system 210 depending at least in part on operating conditions and ambient temperature. The coolant is routed through a battery structure of battery system 210 in order to transfer heat to or from the battery system depending on operating conditions. In various embodiments, the coolant may be circulated between rows or columns of battery cells, above or below battery cells, circumferentially around the battery cells, or a combination thereof. In various embodiments, the coolant may be circulated generally parallel to a length of the battery cells or normal to the length of the battery cells. The coolant path may comprise one or more substantially straight paths, a grid of paths, one or more serpentine paths, or the like. Numerous embodiments are contemplated in this regard.

Heat pump thermal management system 200 further comprises a heat pump loop 218. Heat pump loop 218 comprises a reversible heat pump that may, under certain operating conditions, transfer thermal energy in an opposite direction of spontaneous thermal energy transfer in order to heat or cool various systems depending on operating conditions. Heat pump loop 218 is thermally coupled to battery coolant loop 202 via refrigerant-coolant heat exchanger 216. Heat pump loop 218 is configured to heat or cool a vehicle cabin (such as cabin 104 of FIG. 1) by exchanging heat with the cabin as will be discussed in further detail below. In various embodiments, heat pump loop 218 comprises a heat pump line 220 which fluidly and thermally couples together refrigerant-coolant heat exchanger 216, a second control valve 222, a third control valve 224, a compressor 226, an external heat exchanger 228, an expansion valve 230, a fourth control valve 232, and an internal heat exchanger 234.

Depending on operating conditions and whether the cabin is desired to be heated or cooled, heat pump loop 218 is configured to route a refrigerant in either direction. For example, as illustrated in FIG. 2A, heat pump loop 218 is configured to route refrigerant in a first direction (counterclockwise as illustrated) while bypassing internal heat exchanger 234. However, in various embodiments, heat pump loop 218 is configured to route coolant in the first direction while passing refrigerant through internal heat exchanger 234 or route refrigerant in a second direction (clockwise as illustrated). In the second direction, internal heat exchanger 234 may be bypassed or active as part of heat pump loop 218. As such, heat pump loop 218 is configured to operate in numerous manners in order to provide heating and cooling to the cabin depending on operating conditions and ambient temperature. As will be appreciated by one of ordinary skill in the art, the terms downstream, upstream, inlet, and outlet are relative terms that may change depending on the direction of coolant and refrigerant flowing through battery coolant loop 202 and heat pump loop 218, respectively.

With continued reference to FIG. 2A, heat pump thermal management system 200 is illustrated in a first operating mode, in accordance with various embodiments. As illustrated throughout the figures, solid lines within heat pump thermal management system 200 denote lines actively routing coolant and/or refrigerant and dashed lines denote lines not actively routing coolant and/or refrigerant for a particular operating mode. In the first operating mode, heat pump thermal management system 200 is configured to cool battery system 210 in higher ambient temperature conditions, for example, between approximately 30-50° C. A use case associated with the first operating mode may be where vehicle 100 is being operated in warm ambient conditions (>30° C.) and the driver is away from vehicle 100, has yet to turn on air conditioning to cabin 104, or has manually turned off air conditioning to cabin 104. As such, in the first operating mode, heat pump thermal management system 200 is configured to cool battery system 210 without cooling cabin 104.

Generally speaking, in the first operating mode, refrigerant in heat pump loop 218 undergoes various stages of a vapor-compression refrigeration cycle (or other suitable refrigeration cycle) in order to expel heat from the refrigerant. The refrigerant may comprise a fluid having a high latent heat of vaporization, moderate density in liquid form, high density in gaseous form, and high critical temperature. For example, the battery refrigerant may comprise a fluid containing various compounds such as fluorocarbons, ammonia, sulfur dioxide, or non-halogenated hydrocarbons among others. Further, the battery refrigerant may comprise a class 1, class 2, or class 3 refrigerant in various embodiments. The cooled refrigerant absorbs thermal energy transferred from coolant in battery coolant loop 202 and is continually cooled by cycling through heat pump loop 218. Coolant from the battery coolant loop 202 is cooled through the transfer of heat to the refrigerant and is used to cool battery system 210.

As stated above, battery coolant loop 202 comprises battery coolant line 204 configured to route coolant to various components of battery coolant loop 202, including battery system 210. Similarly, heat pump loop 218 comprises heat pump line 220 configured to route refrigerant to various components of heat pump loop 218. Battery coolant line 204 and heap pump line 220 may comprise tubes or hoses made of ethylene propylene diene monomer rubber (EPDM), silicone, or neoprene, for example. The coolant in battery coolant line 204 may have a high thermal capacity, a relatively low viscosity, and be chemically inert. Further, the coolant may be a gaseous coolant such as air, helium or other inert gas, or liquid such as water, ethylene glycol, propylene glycol, betaine, polyalkylene glycol, or other suitable coolant or combinations thereof.

With focus on battery coolant loop 202, in the first operating mode, coolant having a relatively high temperature exits a first opening 236 of battery system 210 and enters a first opening 238 of first control valve 208. First control valve 208 may comprise a 3-way, 2-position valve comprising three openings which may function as inlets or outlets depending on the flow direction of coolant. For example, in addition to first opening 238, first control valve 208 may further comprise a second opening 240 and a third opening 242 which may function as inlets or outlets depending on the operating mode. In various embodiments, first control valve 208 may comprise a solenoid valve having an electric motor configured to switch a position of the valve depending on operating conditions and in response to signals received from vehicle control electronics, for example. In the first operating mode, first control valve 208 receives coolant heated due to thermal energy transfer from battery system 210 to the coolant and directs the heated coolant to refrigerant-coolant heat exchanger 216 via second opening 240.

Refrigerant-coolant heat exchanger 216 may comprise any suitable heat exchanger capable of operation in a cocurrent and countercurrent manner. In various embodiments, refrigerant-coolant heat exchanger 216 may comprise a shell and tube, plate, plate and shell, adiabatic wheel, plate fin, pillow plate, fluid, dynamic scraped surface, phase-change, direct contact, microchannel heat exchanger, or other suitable heat exchanger type. In general, refrigerant-coolant heat exchanger 216 comprises a first opening 244, a second opening 246 positioned on an opposite side of first opening 244, a third opening 248 positioned on the same side as second opening 246, and a fourth opening 250 positioned on the same side as first opening 244. Refrigerant-coolant heat exchanger 216 may comprise multiple internal tubes or conduits configured to route the coolant and refrigerant along one or more paths in a cocurrent or countercurrent manner. Based on a temperature gradient between the coolant and refrigerant, thermal energy is transferred via convective heat transfer from the coolant to the refrigerant or vice versa (depending on which fluid is relatively warmer). The structures associated with the internal tubes or conduits of refrigerant-coolant heat exchanger 216 may include large surface areas in order to maximize heat transfer.

In various embodiments, the coolant from battery coolant loop 202 enters first opening 244 of refrigerant-coolant heat exchanger 216 as a warm liquid due to heat transfer from battery system 210 to the coolant. Refrigerant from heat pump loop 218 enters second opening 246 of refrigerant-coolant heat exchanger 216 as a low temperature, low pressure two-phase mixture. The coolant may have a higher temperature than the refrigerant. The coolant and refrigerant travel through refrigerant-coolant heat exchanger 216 in a countercurrent manner and thermal energy from the coolant is transferred to the refrigerant via convective heat transfer. The coolant, now having a relatively lower temperature, exits third opening 248 of refrigerant-coolant heat exchanger 216 and continues to circulate through battery coolant loop 202 to provide further cooling to battery system 210. Vapor quality (defined as the mass fraction of a saturated mixture where saturated vapor is considered to have a quality of 100% while saturated liquid is considered to have a quality of 0%) of the refrigerant increases as it travels through refrigerant-coolant heat exchanger 216 due to heat transfer from the coolant to the refrigerant. As a result, the refrigerant exits fourth opening 250 of refrigerant-coolant heat exchanger 216 as a low temperature, low pressure vapor. The refrigerant then continues to circulate through heat pump loop 218 undergoing various temperature and pressure changes as will be discussed in further detail below.

After exiting third opening 248 of refrigerant-coolant heat exchanger 216, the cooled coolant in battery coolant loop 202 may optionally enter expansion tank 214. Expansion tank 214 is configured to protect battery coolant loop 202 by removing excess pressure from the system. For example, under certain operating conditions, the coolant may be at an elevated temperature despite heat exchange within battery coolant loop 202. As the coolant expands with an increase in temperature, expansion tank 214 may be configured to accommodate the pressure increase to avoid exceeding a critical pressure limit of battery coolant line 204 and/or prevent undesired venting of the coolant. In various embodiments, expansion tank 214 may comprise a compression expansion tank, bladder expansion tank, diaphragm expansion tank, or any other suitable expansion tank type. Expansion tank 214 is thermally coupled to pump 212 via battery coolant line 204 wherein pump 212 is configured to circulate the coolant throughout battery coolant loop 202, including directly to battery system 210. As such, the coolant continuously circulates through battery coolant loop 202 in order to further cool and/or maintain the temperature of battery system 210 within the desired range.

With continued reference to FIG. 2A, and with primary focus on heat pump loop 218, low temperature, low pressure, vaporized refrigerant exits fourth opening 250 of refrigerant-coolant heat exchanger 216 and is directed to a first opening 252 of second control valve 222. In various embodiments, second control valve 222 comprises a 3-way, 2-position valve substantially similar to or the same as first control valve 208. In addition to first opening 252, second control valve 222 comprises a second opening 254 and third opening 256 which can function as inlets or outlets depending on the operating mode. In the first operating mode, no cooling is provided to cabin 104 of vehicle 100, so second control valve 222 bypasses internal heat exchanger 234 and instead routes the refrigerant to a first opening 258 of third control valve 224 via second opening 254. In contrast to first control valve 208 and second control valve 222, third control valve 224 may comprise a 4-way, 2-position valve. Third control valve 224 may comprise a solenoid valve having an electric motor configured to switch a position of the valve depending on operating conditions and in response to signals received from control electronics of vehicle 100, for example. In addition to first opening 258, third control valve 224 further comprises a second opening 260, a third opening 262, and a fourth opening 264 which can function as inlets or outlets depending on the operating mode.

Refrigerant from second control valve 222 enters first opening 258 and exits second opening 260 of third control valve 224. From second opening 260, the refrigerant is directed to a first opening 266 of compressor 226. In various embodiments, compressor 226 may be a scroll, screw, centrifugal, reciprocating, or other suitable type of compressor configured to compress and increase a pressure of the refrigerant which, in turn, may increase the temperature of the refrigerant. After compression, the refrigerant exits a second opening 268 of compressor 226 as a high temperature, high pressure vapor and is directed to third opening 262 of third control valve 224, through third control valve 224, and out of fourth opening 264 of third control valve 224.

After exiting third control valve 224, the high temperature, high pressure vaporized refrigerant enters a first opening 270 of external heat exchanger 228. Similar to refrigerant-coolant heat exchanger 216, external heat exchanger 228 may comprise a shell and tube, plate, plate and shell, adiabatic wheel, plate fin, pillow plate, fluid, dynamic scraped surface, phase-change, direct contact, microchannel heat exchanger, or other suitable heat exchanger type. In various embodiments, external heat exchanger 228 comprises a two-phase heat exchanger. External heat exchanger 228 may be equipped with a fan to increase convective heat transfer between the refrigerant and the ambient environment. After entering external heat exchanger 228, thermal energy is transferred from the refrigerant to the ambient environment. The refrigerant, now a high temperature, high pressure liquid, exits a second opening 272 of external heat exchanger 228 and is directed to a first opening 274 of expansion valve 230.

In various embodiments, expansion valve 230 is configured to control the amount of refrigerant that, depending on the operating mode, enters refrigerant-coolant heat exchanger 216, internal heat exchanger 234, and/or external heat exchanger 228. In various embodiments, expansion valve 230 comprises a bidirectional expansion valve configured to throttle refrigerant flow in either direction. Expansion valve 230 may comprise a thermal expansion valve (TXV) which may comprise one or more temperature sensing bulbs filled with a gas or liquid that causes the valve to open by biasing a spring pressure element as temperature in the bulb increases. On the other hand, if the temperature on the bulb decreases, pressure in the bulb may decrease and allow the valve to close. Alternatively, expansion valve 230 may be an electronic expansion valve (EXV) which may be electrically controlled using a control algorithm to ensure the refrigerant exits the expansion valve at a desired temperature and pressure. For example, as illustrated in FIG. 2A, one or more pressure and/or temperature sensors may be positioned downstream of refrigerant-coolant heat exchanger 216 (between refrigerant-coolant heat exchanger 216 and second control valve 222) and internal heat exchanger 234 (between internal heat exchanger 234 and third control valve 224), and upstream of external heat exchanger 228 (between external heat exchanger 228 and third control valve 224) which may signal expansion valve 230 to increase or decrease a flow rate of refrigerant flowing through expansion valve 230. In various embodiments, expansion valve 230 may be an internally or externally equalized valve. Expansion valve 230 may be configured to abruptly decrease a pressure of the refrigerant. Such a decrease in pressure may result in flash evaporation of a portion of the liquid refrigerant and may lower the temperature of the refrigerant. As such, in the first operating mode, refrigerant exits a second opening 276 of expansion valve 230 as low temperature, low pressure, two-phase mixture. While discussed herein in relation to an expansion valve, heat pump loop 218 may comprise any suitable metering device, for example, a capillary tube.

From second opening 276 of expansion valve 230, the refrigerant is directed to a first opening 278 of fourth control valve 232. In various embodiments, fourth control valve 232 may comprise a 3-way, 2-position valve substantially similar to or the same as first control valve 208 and/or second control valve 222. In addition to first opening 278, fourth control valve 232 further comprises a second opening 280 and a third opening 282 which can function as inlets or outlets depending on the operating mode. In the first operating mode, no cooling is provided to cabin 104 of vehicle 100, so fourth control valve 232 bypasses internal heat exchanger 234 and instead routes the refrigerant to second opening 246 of refrigerant-coolant heat exchanger 216 via second opening 280 of fourth control valve 232. As previously discussed, the cooled refrigerant absorbs thermal energy from warmed coolant in refrigerant-coolant heat exchanger 216 via convective heat transfer and continually circulates through heat pump loop 218 to maintain and/or reduce the operating temperature of battery system 210.

Figure 2B:
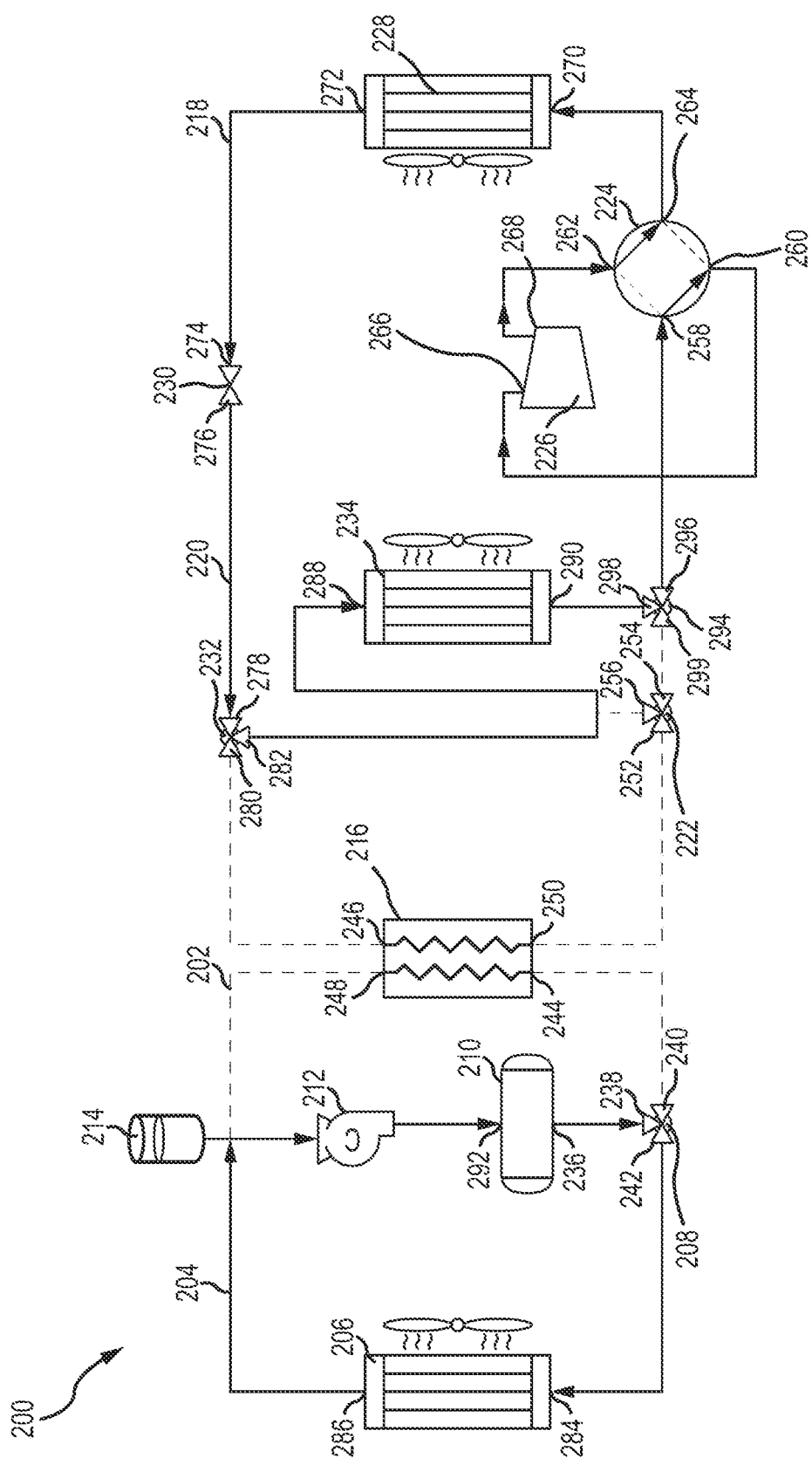
FIG. 2B illustrates a heat pump thermal management system in a second operating mode, in accordance with various embodiments.

Referring now to FIG. 2B, heat pump thermal management system 200 is illustrated in a second operating mode, in accordance with various embodiments. In the second operating mode, heat pump thermal management system 200 is configured to provide air conditioning to cabin 104 of vehicle 100 in higher ambient temperature conditions, for example, between approximately 20° C.-50° C. However, in contrast to the first operating mode, in the second operating mode heat pump thermal management system 200 does not provide additional cooling to battery system 210 via a vapor-compression refrigeration cycle. Instead, the additional cooling of the vapor-compression refrigeration cycle is used to cool cabin 104 while heat generated by battery system 210 may be disposed utilizing a radiator, for example. A use case associated with the second operating mode may be where vehicle 100 is being operated in warm ambient conditions (>20° C.) with battery system 210 cooled but the operator desires air conditioning for comfort. In the second operating mode, refrigerant-coolant heat exchanger 216 is inactive. Stated otherwise, in the second operating mode, no thermal energy is transferred between the coolant in battery coolant loop 202 and the refrigerant in heat pump loop 218.

With primary focus on battery coolant loop 202, coolant heated due to heat transfer from battery system 210 is directed to first opening 238 of first control valve 208. In the second operating mode, first control valve 208 is positioned such that refrigerant-coolant heat exchanger 216 is bypassed and the coolant is instead directed to radiator 206. More specifically, in the second operating mode, first control valve 208 is positioned such that, instead of exiting second opening 240 of first control valve 208, coolant exits third opening 242 of first control valve 208 and is directed to a first opening 284 of radiator 206.

Radiator 206 transfers heat in the coolant to an external environment (for example, the ambient environment external to vehicle 100). While illustrated as comprising a single radiator, radiator 206 is not limited in this regard and may comprise two or more radiators in series and/or parallel. In various embodiments, radiator 206 may comprise one or more fins which may increase the surface area of the radiator. As heated coolant flows through the one or more fins of radiator 206, thermal energy is transferred to the external environment via convective heat transfer. As a result, the coolant is cooled as it flows through radiator 206. In various embodiments, radiator 206 may be equipped with a fan which may assist in convective heat transfer to the external environment. However, in various embodiments, radiator 206 may be devoid of a fan and instead may utilize air flowing into or around vehicle 100 to assist in heat transfer and therefore reduce power consumption resulting from operation of the fan. The cooled coolant exits a second opening 286 of radiator 206 and is directed to expansion tank 214 and/or pump 212 which may continuously route the coolant through battery coolant loop 202 to maintain the temperature of battery system 210 within the desired range.

Turning to heat pump loop 218, in the second operating mode, cooled refrigerant exits second opening 276 of expansion valve 230 as a low temperature, low pressure two-phase mixture. In the second operating mode, fourth control valve 232 is positioned such that the refrigerant exits the third opening 282 of fourth control valve 232. As a result, refrigerant-coolant heat exchanger 216 is bypassed, and the refrigerant is directed to a first opening 288 of internal heat exchanger 234.

In various embodiments, internal heat exchanger 234 may comprise a shell and tube, plate, plate and shell, adiabatic wheel, plate fin, pillow plate, fluid, dynamic scraped surface, phase-change, direct contact, microchannel heat exchanger, or other suitable heat exchanger type. In various embodiments, internal heat exchanger 234 comprises a two-phase heat exchanger. Internal heat exchanger 234 may be equipped with a fan to increase convective heat transfer between the refrigerant and the cabin. In various embodiments, the fan may be reversible depending on the direction of heat transfer. After entering internal heat exchanger 234, thermal energy is transferred from the cabin air to the refrigerant. As a result, cabin 104 is cooled. As the refrigerant travels through internal heat exchanger 234 and becomes heated due to thermal energy transfer from the cabin air, the refrigerant may evaporate and exits internal heat exchanger 234 via a second opening 290 as high temperature, high pressure vapor. At this stage, the refrigerant may continue to circulate through heat pump loop 218 to continually provide cooling to cabin 104.

Figure 2C:
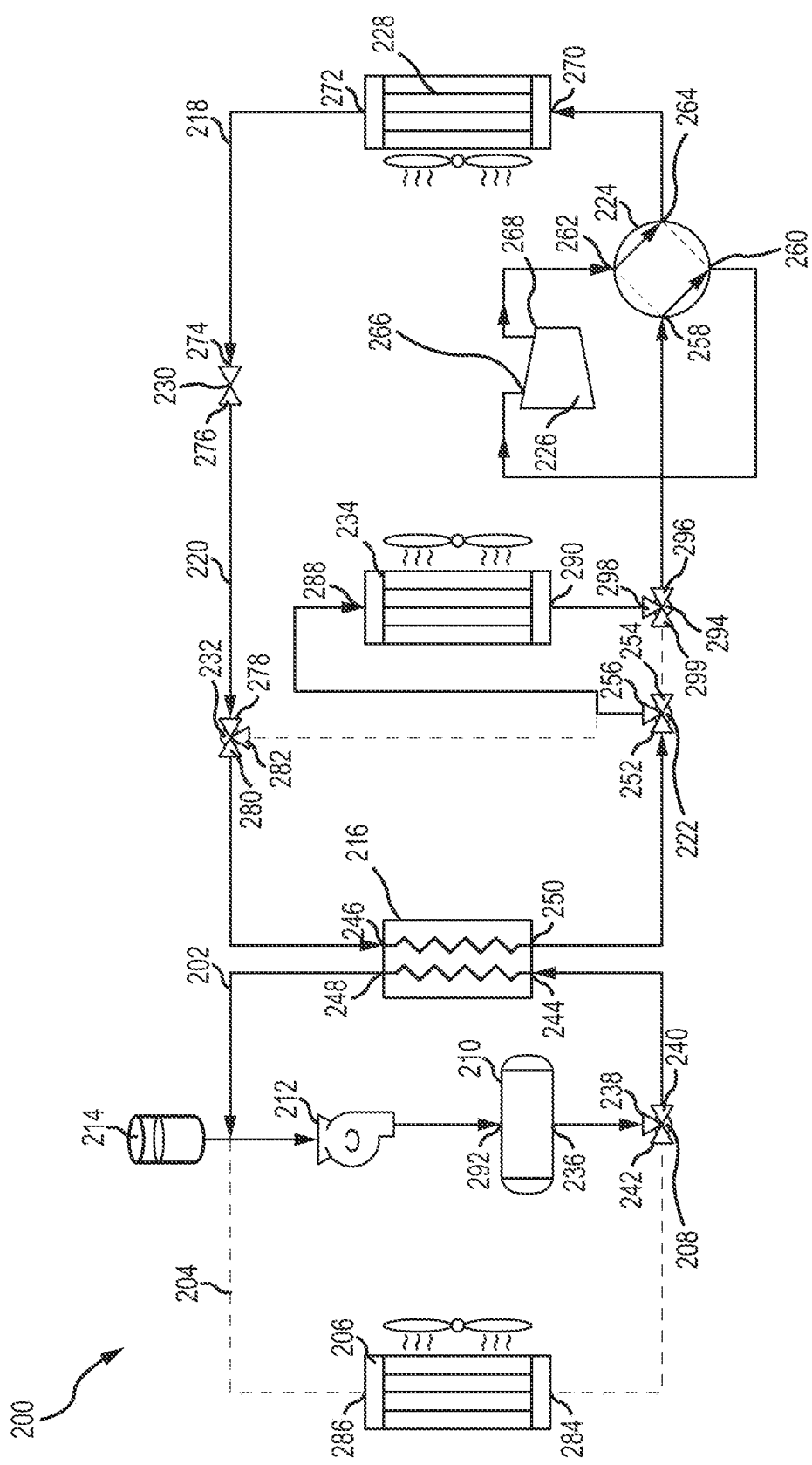
FIG. 2C illustrates a heat pump thermal management system in a third operating mode, in accordance with various embodiments.

Referring now to FIG. 2C, heat pump thermal management system 200 is illustrated in a third operating mode, in accordance with various embodiments. In the third operating mode, heat pump thermal management system 200 is configured to cool battery system 210 and provide air conditioning to cabin 104 of vehicle 100 in higher ambient temperature conditions, for example, between approximately 30-50° C. In contrast to the first operating mode and the second operating mode, heat pump thermal management system 200 provides cooling to battery system 210 and cabin 104 using a vapor-compression refrigeration cycle. A use case associated with the third operating mode may be where vehicle 100 is started in warm ambient conditions (>30° C.) with battery system 210 desiring cooling and the operator desires air conditioning for comfort. In the third mode, refrigerant-coolant heat exchanger 216 is active and allows heat transfer between battery coolant loop 210 and heat pump loop 218.

With initial focus on battery coolant loop 202, low temperature coolant enters a second opening 292 of battery system 210. Thermal energy is transferred from battery system 210 to the coolant in order to cool battery system 210. For example, heat may flow on a downward temperature gradient from the higher temperature battery system 210 to the lower temperature coolant. The warmed coolant exits first opening 236 of battery system 210 and enters first opening 238 of first control valve 208. In the third operating mode and similar to the first operating mode, first control valve 208 is configured to bypass radiator 206 and instead route the coolant to refrigerant-coolant heat exchanger 216. For example, in the third operating mode, first control valve 208 is positioned such that coolant is permitted to flow through second opening 240 but prevented from flowing through third opening 242.

With focus on heat pump loop 218, refrigerant exits fourth opening 264 of third control valve 224 as a high temperature, high pressure vapor due to compression in compressor 226. The refrigerant enters first opening 270 of external heat exchanger 228 and transfers heat to the ambient environment via convective heat transfer. In the process, the refrigerant cools and condenses and exits second opening 272 of external heat exchanger 228 as a high temperature, high pressure liquid. The refrigerant may then flow through expansion valve 230 where it expands and exits as a low temperature, low pressure, two-phase mixture.

In the third operating mode, fourth control valve 232 is positioned such that flow of refrigerant is permitted to flow through second opening 280 and prevented from flowing through the third opening 282. As a result, internal heat exchanger 234 is bypassed at this stage and the refrigerant is directed to refrigerant-coolant heat exchanger 216 where the refrigerant enters second opening 246. After entering second opening 246, the refrigerant flows through refrigerant-coolant heat exchanger 216 in a countercurrent manner in relation to coolant flowing through first opening 244. Thermal energy is transferred from the relatively warmer coolant to the relatively cooler refrigerant. As a result, the coolant exits refrigerant-coolant heat exchanger 216 via third opening 248 as a cooled liquid that continually circulates through battery coolant loop 202 to cool battery system 210.

Due to the heat transfer from the coolant to the refrigerant in refrigerant-coolant heat exchanger 216, the refrigerant exits fourth opening 250 of refrigerant-coolant heat exchanger 216 as a relatively low temperature, low pressure two-phase mixture. After exiting fourth opening 250 of refrigerant-coolant heat exchanger 216, the refrigerant is directed to first opening 252 of second control valve 222. In the third operating mode, second control valve 222 is positioned such that refrigerant is permitted to flow through third opening 256 and prevented from flowing through second opening 254. As a result, the refrigerant is able to enter first opening 288 of internal heat exchanger 234 in order to provide cooling to the cabin. For example, after entering first opening 288, thermal energy is transferred from the relatively warmer cabin air to the relatively cooler refrigerant. This heat transfer may result in cooler air that may be circulated throughout cabin 104 and may result in an increase in vapor quality for the refrigerant which exits second opening 290 of internal heat exchanger 234 as a low temperature, low pressure vapor. From there, the refrigerant continually circulates through compressor 226, external heat exchanger 228, expansion valve 230, refrigerant-coolant heat exchanger 216, and internal heat exchanger 234 to continuously provide cooling to the coolant of battery coolant loop 202 and cabin 104.

Figure 3A:
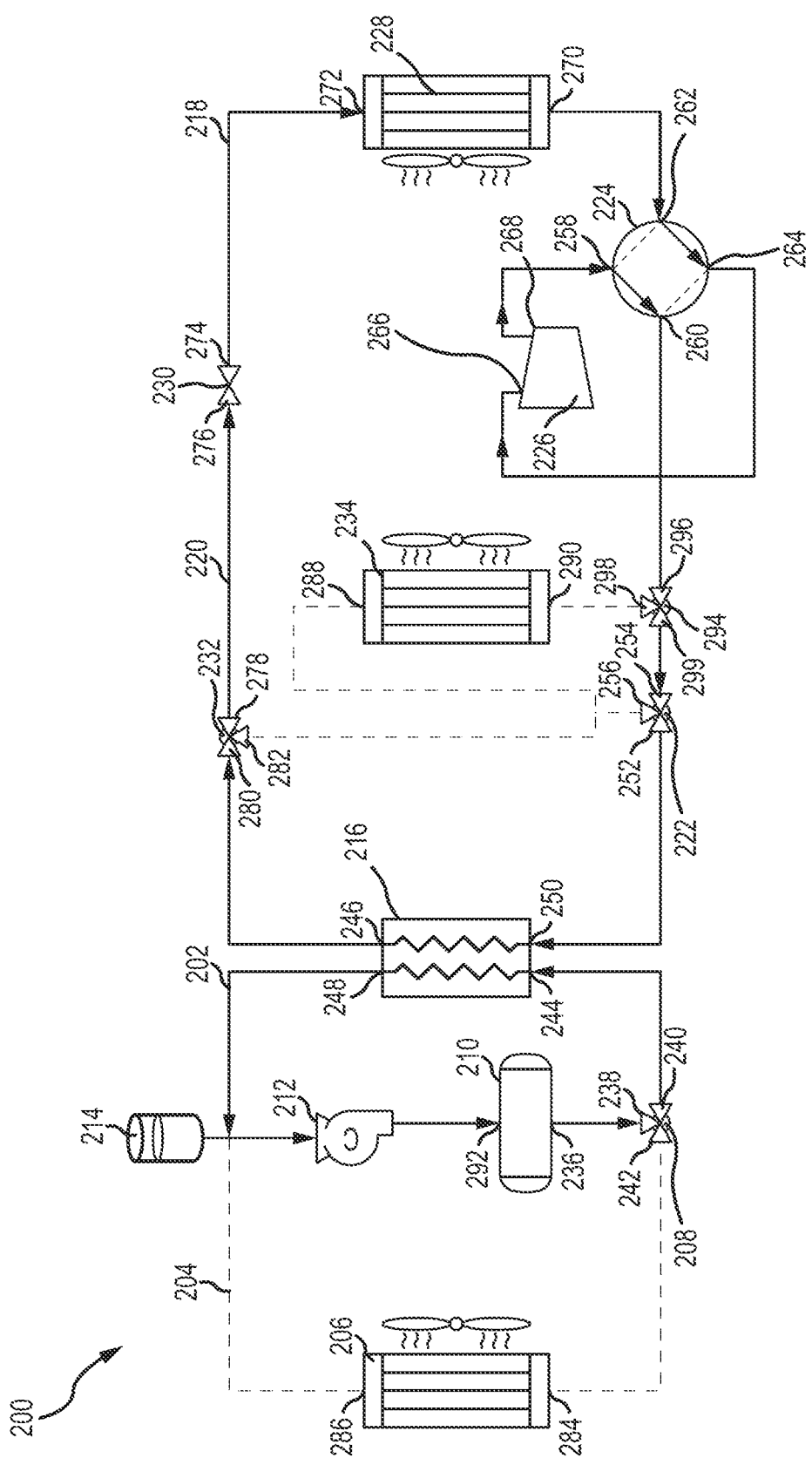
FIG. 3A illustrates a heat pump thermal management system in a fourth operating mode, in accordance with various embodiments.

With reference now to FIG. 3A, heat pump thermal management system 200 is illustrated in a fourth operating mode, in accordance with various embodiments. In the fourth operating mode, heat pump thermal management system 200 is configured to preheat (precondition) battery system 210 in colder ambient temperature conditions, for example between approximately −30° C.-0° C. A use case associated with the fourth operating mode may be where vehicle 100 is being operated in cold ambient conditions (<0° C.) and the driver is away from vehicle 100, has yet to turn on a heater for cabin 104, or has manually turned off a heater for cabin 104. As such, in the fourth operating mode, heat pump thermal management system 200 is configured to heat battery system 210 without heating cabin 104. In the fourth operating mode, heat pump loop 218 is configured to route the refrigerant in a reverse direction (relative to the direction of refrigerant flow in the first three operating modes) in order to transfer heat to battery system 210 rather than remove heat from battery system 210.

In the fourth operating mode, warmed coolant enters second opening 292 of battery system 210. In contrast to the first three operating modes, in the fourth operating mode, thermal energy is transferred from the coolant to battery system 210 in order to preheat (precondition) battery system 210 to a desired temperature (or within a desired temperature range). Due to the loss of thermal energy, the coolant cools and should be reheated in order to continue providing heat to battery system 210. As such, in various embodiments, the cooled coolant exits first opening 236 of battery system 210 and enters first opening 244 of refrigerant-coolant heat exchanger 216. Refrigerant from heat pump loop 218 enters fourth opening 250 (now functioning as an inlet) of refrigerant-coolant heat exchanger 216 as a high temperature, high pressure vapor. The refrigerant may have a higher temperature than the coolant. The coolant and refrigerant travel through refrigerant-coolant heat exchanger 216 in a cocurrent manner and thermal energy from the refrigerant is transferred to the coolant via convective heat transfer. The coolant, now having a relatively higher temperature, exits third opening 248 of refrigerant-coolant heat exchanger 216 and continues to circulate through battery coolant loop 202 to provide further heating to battery system 210. As the refrigerant travels through refrigerant-coolant heat exchanger 216, the refrigerant cools and condenses. As a result, the refrigerant exits second opening 246 of refrigerant-coolant heat exchanger 216 as a high temperature, high pressure liquid. The refrigerant continues to circulate through heat pump loop 218 undergoing various temperature and pressure changes as will be discussed in further detail below.

After exiting third opening 248 of refrigerant-coolant heat exchanger 216, the cooled coolant in battery coolant loop 202 may optionally enter expansion tank 214. Expansion tank 214 is thermally coupled to pump 212 via battery coolant line 204 wherein pump 212 is configured to circulate the coolant throughout battery coolant loop 202, including directly to battery system 210. As such, the coolant continuously circulates through battery coolant loop 202 in order to further heat and/or maintain the temperature of battery system 210 within the desired range.

With continued reference to FIG. 3A, and with primary focus on heat pump loop 218, the high temperature, high pressure, liquid refrigerant exits second opening 246 (now functioning as an outlet) of refrigerant-coolant heat exchanger 216 and is directed to second opening 280 (now functioning as an inlet) of fourth control valve 232. In the fourth operating mode, no heat is provided to cabin 104 of vehicle 100, so fourth control valve 232 bypasses internal heat exchanger 234 and instead routes the refrigerant to second opening 276 (now functioning as an inlet) of expansion valve 230 via first opening 278 of fourth control valve 232 (now functioning as an outlet). The refrigerant is expanded in expansion valve 230 and exits first opening 274 as a low temperature, low pressure, two-phase mixture.

After exiting first opening 274 of expansion valve 230, the refrigerant enters second opening 272 (now functioning as an inlet) of external heat exchanger 228. Even though the ambient environment may be relatively cold in the fourth operating mode, the temperature of the refrigerant passing through external heat exchanger 228 may be colder than the ambient temperature, thereby allowing convective heat transfer from the ambient environment to the refrigerant. The convective heat transfer may be assisted by the fan of external heat exchanger 228, which may operate in reverse compared to the first three operating modes. As a result, the fan may assist in airflow into vehicle 100 rather than out of vehicle 100. As thermal energy is transferred from the ambient environment to the refrigerant in external heat exchanger 228, the vapor quality of the refrigerant increases and the refrigerant exits first opening 270 (now functioning as an outlet) of external heat exchanger 228 as a low temperature, low pressure vapor.

In the fourth operating mode (and fifth and sixth operating modes), third control valve 224 is positioned such that refrigerant is permitted to flow in an opposite direction from the first three operating modes while preventing refrigerant from flowing in the direction of flow permitted during the first three operating modes. Stated otherwise, in the first three operating modes, the refrigerant is permitted to flow from compressor 226 to external heat exchanger 228, while in the fourth operating mode (and fifth and sixth operating modes), the refrigerant is permitted to flow from external heat exchanger 228 to compressor 226. More specifically, in response to a control signal to third control valve 224, for example, third control valve 224 may rotate, translate, or otherwise move to reconfigure the valve position and redirect refrigerant flow. As such, in the fourth operating mode, the refrigerant enters third opening 262 (still functioning as an inlet) of third control valve 224 and exits fourth opening 264 (still functioning as an outlet) of third control valve 224. The refrigerant then enters first opening 266 of compressor 226, is compressed, and exits second opening 268 of compressor 226. Similar to the first three operating modes, the refrigerant may exit second opening 268 of compressor 226 as a high temperature, high pressure vapor. From compressor 226, the refrigerant is directed to first opening 258 (still functioning as an inlet) and out of second opening 260 (still functioning as an outlet) of third control valve 224 and directed to second control valve 222. Similar to fourth control valve 232, second control valve 222 may be positioned such that second control valve 222 bypasses internal heat exchanger 234. For example, second control valve 222 may permit the refrigerant to exit first opening 252 (now functioning as an outlet) but prevent the refrigerant from exiting third opening 256. As a result, the refrigerant enters second opening 254, exits first opening 252, and continually circulates throughout heat pump loop 218 to continually provide heat transfer to the coolant to preheat (or precondition) battery system 210.

Figure 3B:
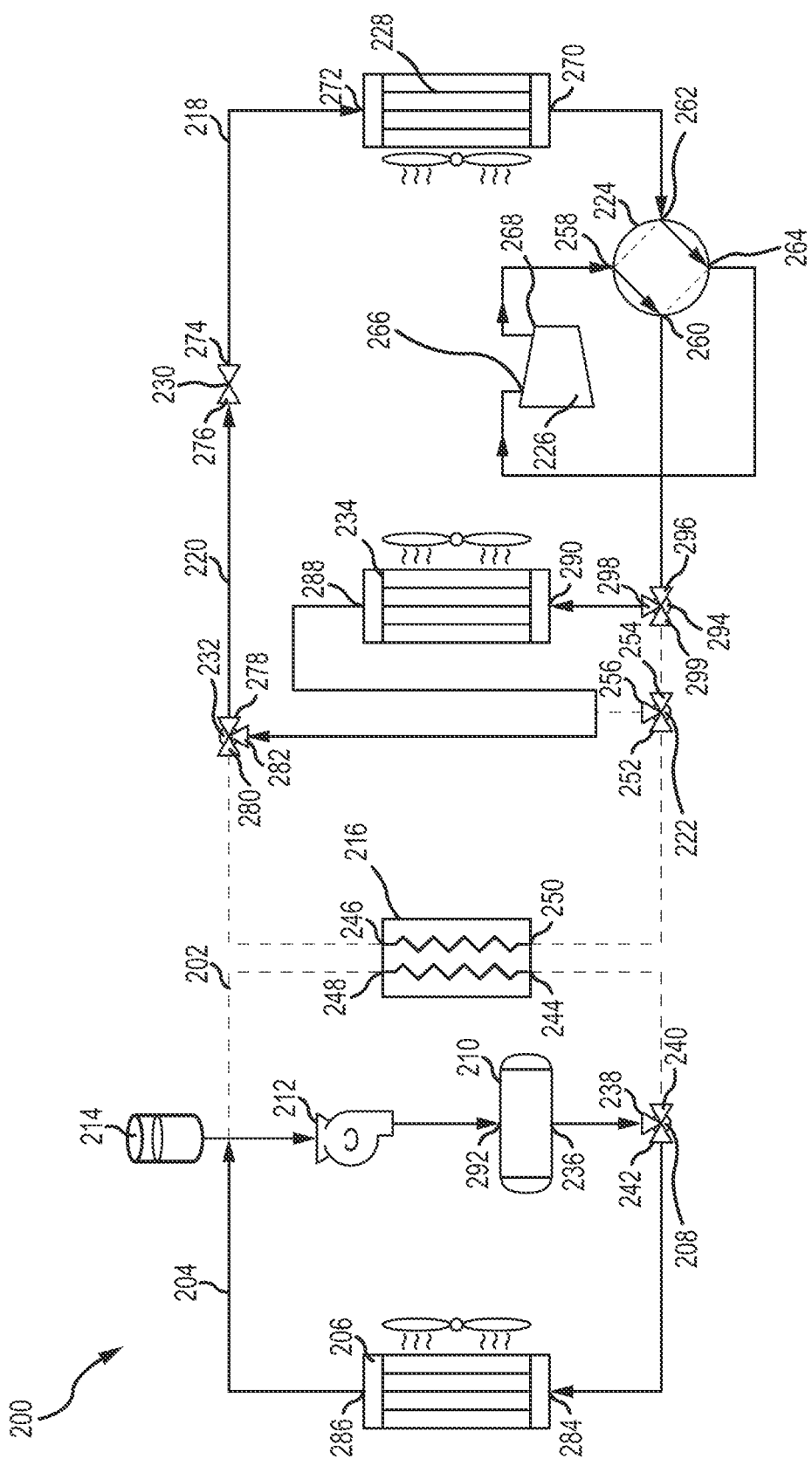
FIG. 3B illustrates a heat pump thermal management system in a fifth operating mode, in accordance with various embodiments.

Referring now to FIG. 3B, heat pump thermal management system 200 is illustrated in a fifth operating mode, in accordance with various embodiments. In the fifth operating mode, heat pump thermal management system 200 is configured to provide heating to cabin 104 of vehicle 100 in lower ambient temperature conditions, for example, between approximately −30° C.-20° C. However, in contrast to the fourth operating mode, heat pump thermal management system 200 does not provide heating to battery system 210 via a vapor-compression refrigeration cycle. Instead, the heat provided by the vapor-compression refrigeration cycle may be used to heat cabin 104 while excess heat generated by battery system 210 may be disposed utilizing radiator 206, for example. A use case associated with the fifth operating mode may be where vehicle 100 is being operated in cold ambient conditions (−30° C.-20° C.) with battery system 210 already heated and a user desires cabin 104 to be heated for comfort. In the fifth operating mode, refrigerant-coolant heat exchanger 216 is inactive. Stated otherwise, in the fifth operating mode, no thermal energy is transferred between the coolant in battery coolant loop 202 and the refrigerant in heat pump loop 218.

With primary focus on battery coolant loop 202, coolant heated due to heat transfer from battery system 210 is directed to first opening 238 of first control valve 208. In the fifth operating mode, first control valve 208 may be positioned such that refrigerant-coolant heat exchanger 216 is bypassed and the coolant is instead directed to radiator 206. More specifically, in the fifth operating mode, first control valve 208 is positioned such that, instead of exiting second opening 240 of first control valve 208, coolant exits third opening 242 of first control valve 208 and is directed to first opening 284 of radiator 206.

Radiator 206 transfers heat in the coolant to an external environment (for example, the ambient environment external to vehicle 100). As heated coolant flows through radiator 206, thermal energy is transferred to the external environment via convective heat transfer. As a result, the coolant is cooled as it flows through radiator 206. The cooled coolant exits second opening 286 of radiator 206 and is directed to expansion tank 214 and/or pump 212 which continuously routes the coolant through battery coolant loop 202 to maintain the temperature of battery system 210 within the desired range.

Turning to heat pump loop 218, in the fifth operating mode, similar to the fourth operating mode, the refrigerant exits compressor 226 (and third control valve 224) as a high temperature, high pressure vapor. In the fifth operating mode, second control valve 222 may be positioned such that refrigerant is prevented from flowing into or out of second control valve 222. For example, second control valve 222 may be positioned such that first opening 252, second opening 254, and third opening 256 are closed. Rather than entering second control valve 222, the refrigerant exiting compressor 226 (and third control valve 224) is directed to second opening 290 (now functioning as an inlet) of internal heat exchanger 234 from third control valve 224. In various embodiments, a fifth control valve 294, which may comprise a 3-way, 2-position valve similar to first control valve 208, second control valve 222, or fourth control valve 232, may be positioned upstream of second control valve 222 (and internal heat exchanger 234) and downstream of third control valve 224. In the fifth operating mode, fifth control valve 294 permits refrigerant to flow directly to second opening 290 of internal heat exchanger 234, while preventing refrigerant from flowing into second control valve 222. For example, in various embodiments, fifth control valve 294 comprises a first opening 296, a second opening 298, and a third opening 299. First opening 296, second opening 298, and third opening 299 may function as inlets or outlets depending on the operating mode and the direction of refrigerant flowing through heat pump loop 218 and/or fifth control valve 294. In the fifth operating mode, first opening 296 functions as an inlet and second opening 298 functions as an outlet, thereby directing the refrigerant to second opening 290 of internal heat exchanger 234.

After entering second opening 290 of internal heat exchanger 234, the refrigerant transfers heat to cabin 104 through convective heat transfer. In the fifth operating mode, the refrigerant has a higher temperature than the air in cabin 104, thereby allowing heat transfer along a downward gradient from the refrigerant to the cabin air. In the process, the refrigerant loses thermal energy and exits first opening 288 of internal heat exchanger 234 as a high temperature, high pressure liquid. From internal heat exchanger 234, the refrigerant enters third opening 282 of fourth control valve 232. In the fifth operating mode, fourth control valve 232 is positioned such that refrigerant is permitted to flow in the direction of expansion valve 230 only. As a result, after entering fourth control valve 232, the refrigerant continually circulates through expansion valve 230, external heat exchanger 228, third control valve 224, and compressor 226 to reheat the refrigerant and provide additional heat transfer to cabin 104.

Figure 3C:
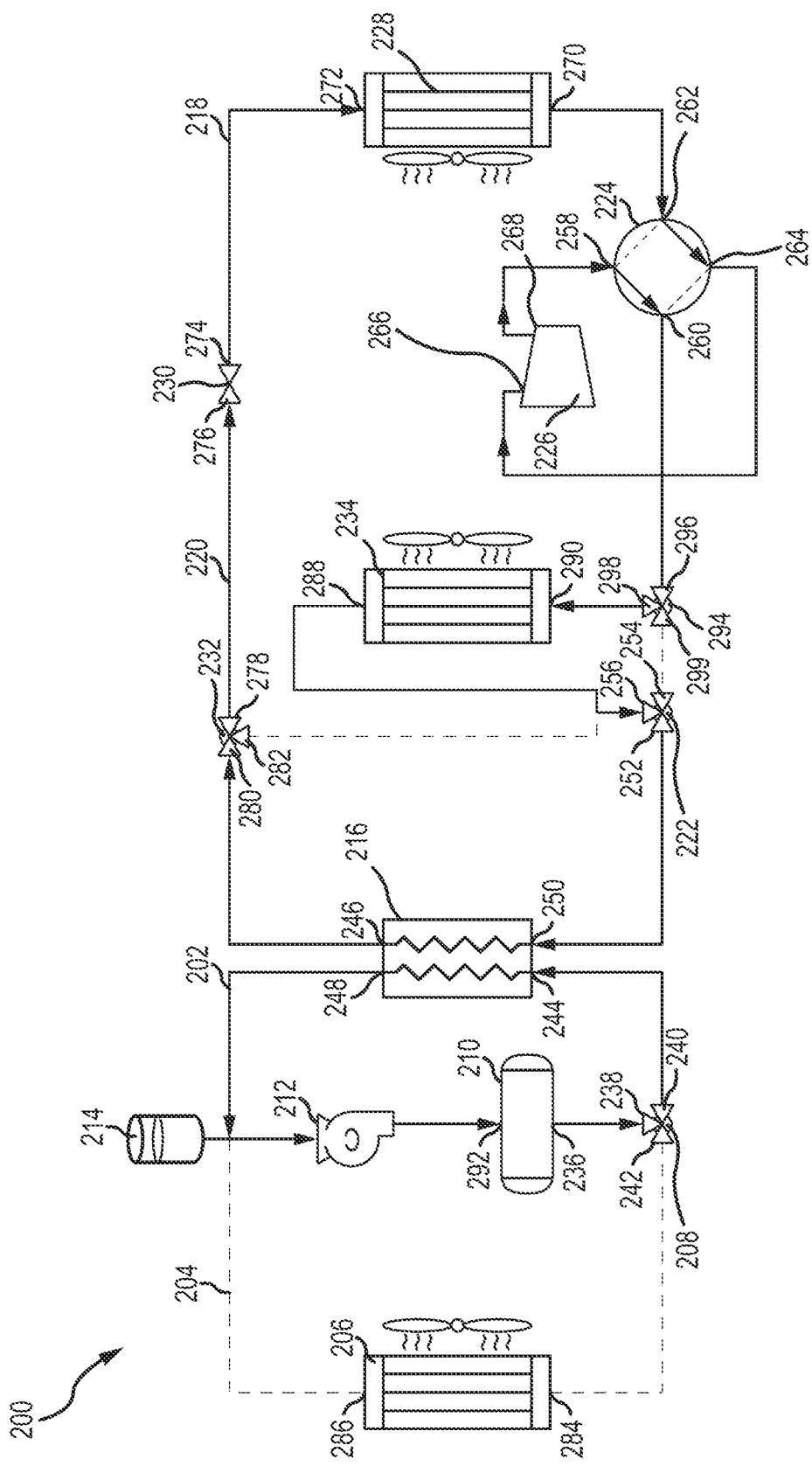
FIG. 3C illustrates a heat pump thermal management system in a sixth operating mode, in accordance with various embodiments.

Referring now to FIG. 3C, heat pump thermal management system 200 is illustrated in a sixth operating mode, in accordance with various embodiments. In the sixth operating mode, heat pump thermal management system 200 is configured to heat battery system 210 and provide heat to cabin 104 of vehicle 100 in lower ambient temperature conditions, for example, between approximately −30-0° C. In contrast to the fourth operating mode and the fifth operating mode, heat pump thermal management system 200 provides heat to battery system 210 and cabin 104 using a vapor-compression refrigeration cycle. A use case associated with the sixth operating mode may be where vehicle 100 is started in cold ambient conditions (<0° C.) with battery system 210 utilizing preheating (or preconditioning) and the operator desires cabin 104 to be heated for comfort. In the sixth operating mode, refrigerant-coolant heat exchanger 216 is active and allows heat transfer between battery coolant loop 202 and heat pump loop 218.

With initial focus on battery coolant loop 202, coolant having a relatively high temperature enters second opening 292 of battery system 210. Thermal energy is transferred from the coolant to battery system 210 in order to preheat (precondition) battery system 210. For example, heat may flow on a downward temperature gradient from the higher temperature coolant to the lower temperature battery system 210. Due to the heat transfer, the coolant loses thermal energy and exits first opening 236 of battery system 210 as a cooled liquid and enters first opening 238 of first control valve 208. In the sixth operating mode and similar to the fourth operating mode, first control valve 208 is positioned such that radiator 206 is bypassed, and instead, the coolant is directed to refrigerant-coolant heat exchanger 216. For example, in the sixth operating mode, first control valve 208 is positioned such that coolant is permitted to flow through second opening 240 but prevented from flowing through third opening 242.

With focus on heat pump loop 218, refrigerant exits second opening 260 of third control valve 224 as a high temperature, high pressure vapor due to compression in compressor 226. Similar to the fifth operating mode, in the sixth operating mode, the refrigerant enters first opening 296 of fifth control valve 294 which routes the refrigerant directly to internal heat exchanger 234 through second opening 298. The refrigerant enters second opening 290 (now functioning as an inlet) of internal heat exchanger 234 and transfers heat to cabin 104 via convective heat transfer. In the process, the refrigerant cools and condenses and exits first opening 288 (now functioning as an outlet) of internal heat exchanger 234 as a high temperature, high pressure, two-phase mixture.

After exiting internal heat exchanger 234, the refrigerant is directed to third opening 256 of second control valve 222. In the sixth operating mode, second control valve 222 is positioned such that refrigerant is permitted to flow into third opening 256 (but not second opening 254) and permitted to flow out of first opening 252. As a result, the refrigerant flows into fourth opening 250 of refrigerant-coolant heat exchanger 216. After entering refrigerant-coolant heat exchanger 216, the refrigerant transfers thermal energy to the coolant. For example, contemporaneously with the refrigerant entering fourth opening 250 of refrigerant-coolant heat exchanger 216, coolant enters first opening 244 of refrigerant-coolant heat exchanger 216. The refrigerant and coolant travel concurrently through refrigerant-coolant heat exchanger 216 and, due to the temperature difference between the coolant and refrigerant, thermal energy is transferred from the refrigerant to the coolant. As a result, the coolant exits third opening 248 of refrigerant-coolant heat exchanger 216 and is recirculated throughout battery coolant loop 202 to provide additional heating to battery system 210.

Due to the heat transfer from the refrigerant to the coolant in refrigerant-coolant heat exchanger 216, the vapor quality in the refrigerant decreases and the refrigerant exits second opening 246 of refrigerant-coolant heat exchanger 216 as a low temperature, low pressure liquid. After exiting second opening 246 of refrigerant-coolant heat exchanger 216, the refrigerant is directed to second opening 280 of fourth control valve 232. In the sixth operating mode, fourth control valve 232 is positioned such that refrigerant is permitted to flow through first opening 278 and prevented from flowing through third opening 282. As a result, the refrigerant is directed to second opening 276 of expansion valve 230.

Similar to other operating modes, after entering expansion valve 230, the refrigerant expands and cools and exits first opening 274 of expansion valve 230 as a low temperature, low pressure, two-phase mixture. The refrigerant is then directed through heat pump line 220 to second opening 272 of external heat exchanger 228. As the refrigerant flows through external heat exchanger 228, thermal energy is transferred to the refrigerant from the ambient environment through convective heat transfer and the refrigerant exits first opening 270 of external heat exchanger 228 as a low temperature, low pressure vapor. Following this, the refrigerant may travel through third control valve 224 (in a similar manner as the fourth and fifth operating modes), through compressor 226, and on to internal heat exchanger 234 and refrigerant-coolant heat exchanger 216 to provide further heating to cabin 104 and coolant, respectively.

Therefore, as discussed in detail herein, heat pump thermal management system 200 may provide cooling or heating to battery system 210 and/or cabin 104 depending on operating conditions. In contrast to traditional electric vehicle thermal management systems, heat pump thermal management system 200 may eliminate the necessity of one or more in-line electric heaters. As a result, the overall efficiency of the system may be improved, and capacity of the onboard battery system conserved to increase range of vehicle 100.

Figure 4:
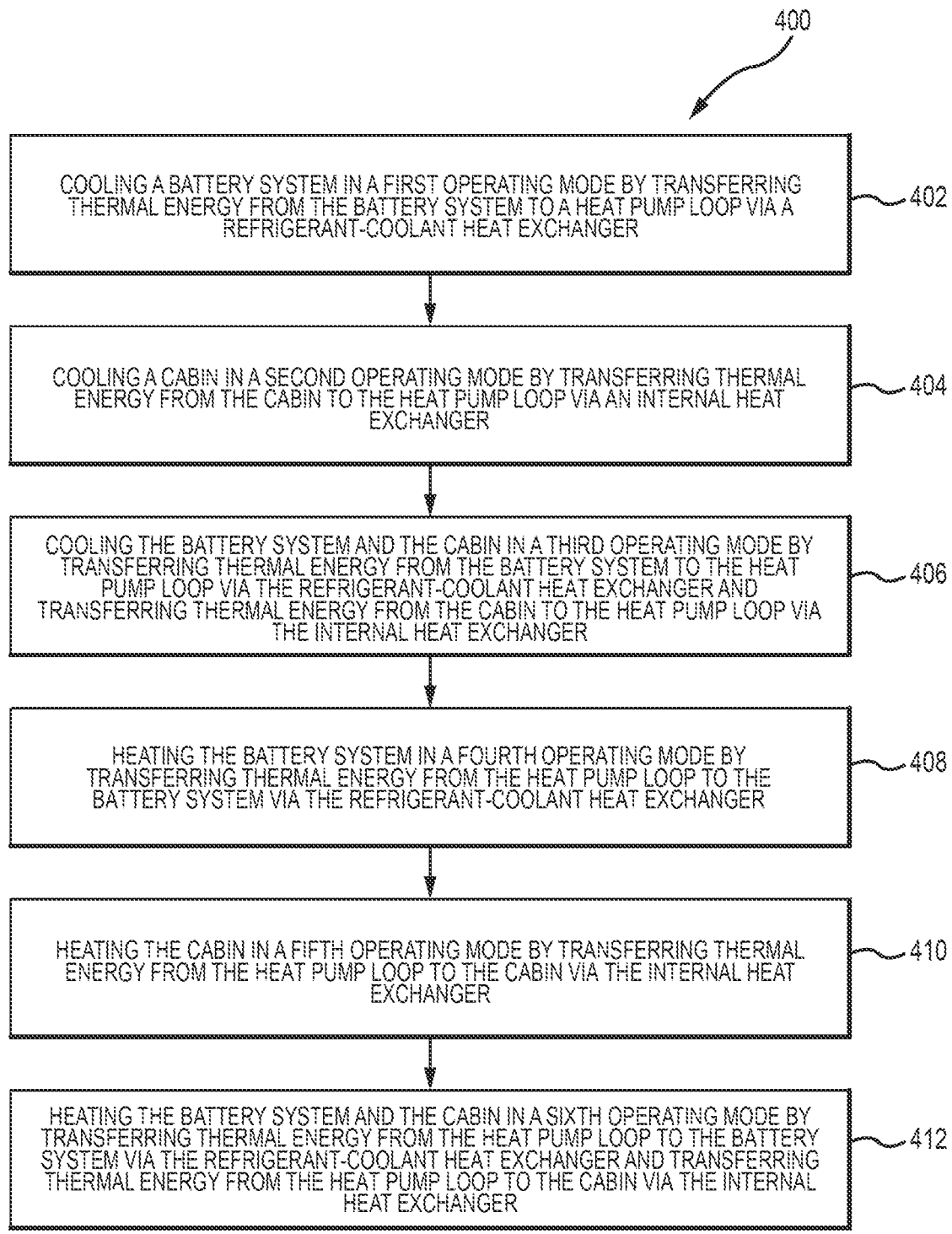
FIG. 4 illustrates a method of thermally regulating a battery system and a cabin of an electric vehicle, in accordance with various embodiments.

Referring now to FIG. 4, a method 400 of thermally regulating a battery system and a cabin of an electric vehicle is illustrated, in accordance with various embodiments. Method 400 comprises cooling the battery system in a first operating mode (step 402). In the first operating mode, thermal energy is transferred from the battery system to a heat pump loop via a refrigerant-coolant heat exchanger. In various embodiments, the refrigerant-coolant heat exchanger is thermally coupled to a battery coolant loop and the heat pump loop. Method 400 further comprises cooling the cabin in a second operating mode (step 404). In the second operating mode, thermal energy is transferred from the cabin to the heat pump loop via an internal heat exchanger. In various embodiments, the internal heat exchanger is thermally coupled to the heat pump loop. Thermal energy is transferred from the battery system to an ambient environment via a radiator thermally coupled to the battery coolant loop. Method 400 further comprises cooling the battery system and cabin 104 of vehicle 100 in a third operating mode (step 406). In the third operating mode, thermal energy is transferred from the battery system to the heat pump loop via the refrigerant-coolant heat exchanger and thermal energy is transferred from the cabin to the heat pump loop via the internal heat exchanger. Method 400 further comprises heating the battery system in a fourth operating mode (step 408). In the fourth operating mode, thermal energy is transferred from the heat pump loop to the battery system via the refrigerant-coolant heat exchanger. Method 400 further comprises heating the cabin in a fifth operating mode (step 410). In the fifth operating mode, thermal energy is transferred from the heat pump loop to the cabin via the internal heat exchanger. Method 400 further comprises heating the battery system and the cabin in a sixth operating mode (step 412). In the sixth operating mode, thermal energy is transferred from the heat pump loop to the battery system via the refrigerant-coolant heat exchanger and thermal energy is transferred from the heat pump loop to the cabin via the internal heat exchanger. A refrigerant circulating throughout the heat pump loop circulates in a first direction in the first operating mode, the second operating mode, and the third operating mode and circulates in a second direction in the fourth operating mode, the fifth operating mode, and the sixth operating mode.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric vehicle, comprising:
 a cabin;
 a battery system; and
 a heat pump thermal management system comprising:
  a battery coolant loop comprising a radiator, an expansion tank, a pump, a first control valve, and a battery coolant line thermally coupled to the battery system;
  a heat pump loop comprising a heat pump line thermally coupled to an internal heat exchanger; and
  a refrigerant-coolant heat exchanger thermally coupled to the battery coolant loop and the heat pump loop,
  wherein, in a first operating mode of the heat pump thermal management system, thermal energy is transferred from the battery system to the heat pump loop via the refrigerant-coolant heat exchanger,
  wherein, in the first operating mode of the heat pump thermal management system, thermal energy is transferred from the battery system to a coolant in the battery coolant line and thermal energy is transferred from the coolant to a refrigerant of the heat pump loop in the refrigerant-coolant heat exchanger,
  wherein, in a second operating mode of the heat pump thermal management system, thermal energy is transferred from the cabin to the heat pump loop via the internal heat exchanger, and
  wherein, in a third operating mode of the heat pump thermal management system, thermal energy is transferred from the battery system to the heat pump loop via the refrigerant-coolant heat exchanger and thermal energy is transferred from the cabin to the heat pump loop via the internal heat exchanger.

2. The electric vehicle of claim 1, wherein the heat pump loop further comprises an external heat exchanger, a compressor, an expansion valve, a second control valve, a third control valve, and a fourth control valve.

3. The electric vehicle of claim 1, wherein, in the first operating mode, thermal energy is transferred from the refrigerant to an ambient environment via an external heat exchanger and the refrigerant is directed to the refrigerant-coolant heat exchanger to absorb thermal energy from the coolant.

4. The electric vehicle of claim 1, wherein, in the second operating mode, the first control valve bypasses the refrigerant-coolant heat exchanger and the coolant in the battery coolant line is directed to the radiator to transfer thermal energy to an ambient environment.

5. The electric vehicle of claim 2, wherein, in the second operating mode, the fourth control valve bypasses the refrigerant-coolant heat exchanger and the refrigerant in the heat pump line is directed to the internal heat exchanger to allow thermal energy to be transferred from the cabin to the internal heat exchanger.

6. The electric vehicle of claim 2, wherein, in the third operating mode, the second control valve directs the refrigerant from the refrigerant-coolant heat exchanger to the internal heat exchanger and thermal energy is transferred from the cabin to the refrigerant in the internal heat exchanger.

7. The electric vehicle of claim 1, wherein the refrigerant-coolant heat exchanger functions as a countercurrent heat exchanger and facilitates thermal energy transfer between the heat pump loop and the battery coolant loop in the first operating mode and the third operating mode.

8. An electric vehicle, comprising:
 a cabin;
 a battery system; and
 a heat pump thermal management system comprising:
  a battery coolant loop comprising a radiator, an expansion tank, a pump, a first control valve, and a battery coolant line thermally coupled to the battery system;
  a heat pump loop comprising a heat pump line thermally coupled to an internal heat exchanger; and
  a refrigerant-coolant heat exchanger thermally coupled to the battery coolant loop and the heat pump loop,
  wherein, in a first operating mode of the heat pump thermal management system, thermal energy is transferred from the heat pump loop to the battery system via the refrigerant-coolant heat exchanger,
  wherein, in a second operating mode of the heat pump thermal management system, thermal energy is transferred from the heat pump loop to the cabin via the internal heat exchanger,
  wherein, in a third operating mode of the heat pump thermal management system, thermal energy is transferred from the heat pump loop to the battery system via the refrigerant-coolant heat exchanger and thermal energy is transferred from the heat pump loop to the cabin via the internal heat exchanger, and
  wherein the first control valve bypasses the radiator in the first operating mode, bypasses the refrigerant-coolant heat exchanger in the second operating mode, and bypasses the radiator in the third operating mode.

9. The electric vehicle of claim 8, wherein the heat pump loop further comprises an external heat exchanger, a compressor, an expansion valve, a second control valve, a third control valve, and a fourth control valve.

10. The electric vehicle of claim 8, wherein, in the first operating mode, thermal energy is transferred from a refrigerant of the heat pump loop to a coolant of the battery coolant loop in the refrigerant-coolant heat exchanger.

11. The electric vehicle of claim 8, wherein the refrigerant-coolant heat exchanger functions as a cocurrent heat exchanger and facilitates thermal energy transfer between the heat pump loop and the battery coolant loop in the first operating mode and the third operating mode.

12. The electric vehicle of claim 8, wherein an external heat exchanger facilitates thermal energy transfer from an ambient environment to the heat pump loop in the first operating mode, the second operating mode, and the third operating mode.

13. The electric vehicle of claim 9, wherein the second control valve bypasses the internal heat exchanger in the second operating mode.

14. The electric vehicle of claim 8, wherein the refrigerant-coolant heat exchanger is inactive in the second operating mode.

15. An electric vehicle, comprising:
 a cabin;
 a battery system; and a heat pump thermal management system comprising:
  a battery coolant loop comprising a radiator, an expansion tank, a pump, a first control valve, and a battery coolant line thermally coupled to the battery system;
  a heat pump loop comprising a heat pump line thermally coupled to an internal heat exchanger; and
  a refrigerant-coolant heat exchanger thermally coupled to the battery coolant loop and the heat pump loop,
wherein, in a first operating mode of the heat pump thermal management system, thermal energy is transferred from the battery system to the heat pump loop via the refrigerant-coolant heat exchanger,
wherein, in a second operating mode of the heat pump thermal management system, thermal energy is transferred from the cabin to the heat pump loop via the internal heat exchanger,
wherein, in the second operating mode of the heat pump thermal management system, the first control valve bypasses the refrigerant-coolant heat exchanger and a coolant in the battery coolant line is directed to the radiator to transfer thermal energy to an ambient environment, and
wherein, in a third operating mode of the heat pump thermal management system, thermal energy is transferred from the battery system to the heat pump loop via the refrigerant-coolant heat exchanger and thermal energy is transferred from the cabin to the heat pump loop via the internal heat exchanger.

\* \* \* \* \*